United States Patent [19]
Lenoir, Jr.

[11] Patent Number: 5,632,302
[45] Date of Patent: May 27, 1997

[54] OVERFLOW PROTECTION SHUT-OFF APPARATUS FOR USE WITH A WATER HEATER

[76] Inventor: Robert M. Lenoir, Jr., 1159 Doe Run, Highland Lakes, N.J. 07422

[21] Appl. No.: 577,692

[22] Filed: Dec. 22, 1995

[51] Int. Cl.⁶ .......................... H01H 29/04; G08B 21/00; F16K 31/02
[52] U.S. Cl. .......................... 137/312; 122/504.2; 122/507; 200/61.04; 200/61.05; 200/DIG. 41; 307/118; 340/604; 340/605; 361/178
[58] Field of Search .......................... 122/504, 504.2, 122/505, 507; 200/61.04, 61.05, DIG. 40, DIG. 41; 307/118; 340/604, 605, 620, 623, 624, 625; 361/178; 137/312, 387; 251/263

[56] References Cited

U.S. PATENT DOCUMENTS

| | | | |
|---|---|---|---|
| 1,028,681 | 6/1912 | Creighton et al. | 251/263 |
| 1,065,521 | 6/1913 | Gorman | 251/263 |
| 3,069,671 | 12/1962 | Taylor | 137/312 |
| 3,770,002 | 11/1973 | Brown | 137/312 |
| 3,874,403 | 4/1975 | Fischer | 137/312 U X |
| 3,920,031 | 11/1975 | Maxfield | 137/312 |
| 4,805,662 | 2/1989 | Moody | 137/312 |
| 4,944,253 | 7/1990 | Bellofatto | 137/312 |
| 5,029,605 | 7/1991 | Dowling et al. | 137/312 |
| 5,188,143 | 2/1993 | Krebs | 137/312 |

*Primary Examiner*—George L. Walton

[57] ABSTRACT

An overflow protection shut-off device for use with a water heater for shutting off a supply of water to the water heater when a leaking or an overflow condition occurs, the device including a valve mechanism coupleable to an input water line of a water heater and having an opened orientation for allowing flow of water within the input line and a closed orientation for preventing such flow; a water sensing mechanism positionable at a location proximal to the water heater for providing a signal when it is placed in contact with water when the water heater experiences the leaking or the overflow condition; and a switching mechanism coupled to the valve mechanism and the water sensing mechanism and with the switching mechanism being responsive to receipt of the signal from the water sensing mechanism for placing the valve mechanism in the closed orientation.

3 Claims, 3 Drawing Sheets

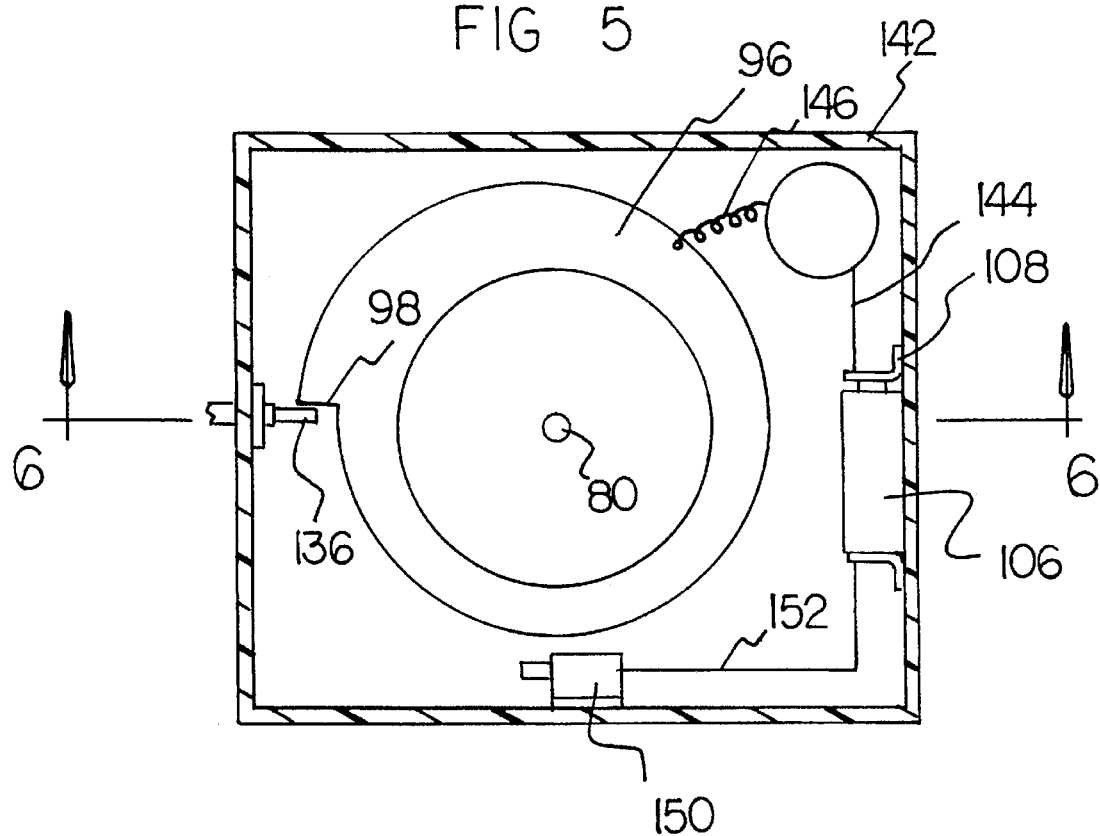
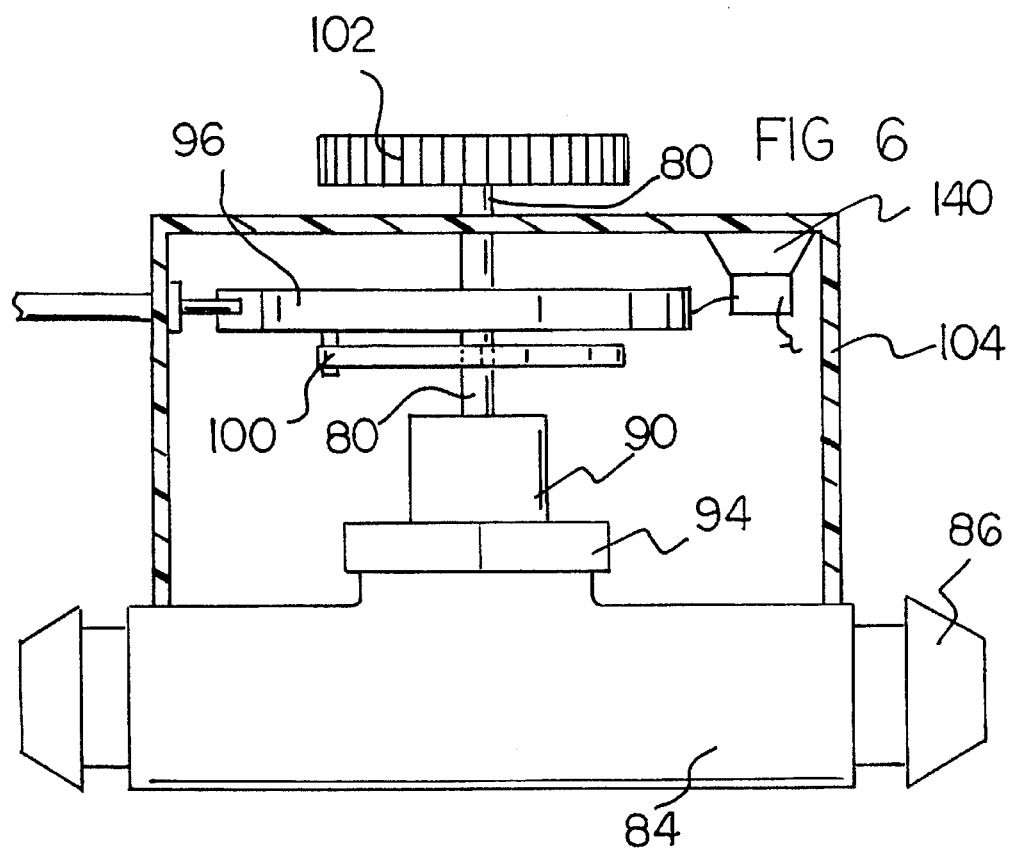

OVERFLOW PROTECTION SHUT-OFF APPARATUS FOR USE WITH A WATER HEATER

BACKGROUND OF THE INVENTION

1. Field of the Invention

The present invention relates to an overflow protection shut-off apparatus for use with a water heater and more particularly pertains to shutting off a supply of water to the water heater when a leaking or an overflow condition occurs with an overflow protection shut-off apparatus for use with a water heater.

2. Description of the Prior Art

The use of water heater shut-off devices is known in the prior art. More specifically, water heater shut-off devices heretofore devised and utilized for the purpose of shutting off a supply of water to the water heater are known to consist basically of familiar, expected and obvious structural configurations, notwithstanding the myriad of designs encompassed by the crowded prior art which have been developed for the fulfillment of countless objectives and requirements.

By way of example, U.S. Pat. No. 3,770,002 to Brown discloses an automatic water shut-off system. U.S. Pat. No. 3,754,563 to Boals discloses an automatic control system for water heaters. U.S. Pat. No. 4,136,823 to Kullberg discloses an apparatus for the prevention or limitation of water damage. U.S. Pat. No. 5,004,014 to Bender discloses an automatic fluid flow sensor and fluid shut-off system. U.S. Pat. No. 5,240,022 to Franklin discloses an automatic shut-off valve.

While these devices fulfill their respective, particular objective and requirements, the aforementioned patents do not describe an overflow protection shut-off apparatus that is simple in design and can be utilized on a new or an existing water heater to prevent water flow to such heater in the event of a leaking or an overflow condition.

In this respect, the overflow protection shut-off apparatus for use with a water heater according to the present invention substantially departs from the conventional concepts and designs of the prior art, and in doing so provides an apparatus primarily developed for the purpose of shutting off a supply of water to the water heater when a leaking or an overflow condition occurs.

Therefore, it can be appreciated that there exists a continuing need for new and improved overflow protection shut-off apparatus for use with a water heater which can be used for shutting off a supply of water to the water heater when a leaking or an overflow condition occurs. In this regard, the present invention substantially fulfills this need.

SUMMARY OF THE INVENTION

In the view of the foregoing disadvantages inherent in the known types of water heater shut-off devices now present in the prior art, the present invention provides an improved overflow protection shut-off apparatus for use with a water heater. As such, the general purpose of the present invention, which will be described subsequently in greater detail, is to provide a new and improved overflow protection shut-off apparatus for use with a water heater and method which has all the advantages of the prior art and none of the disadvantages.

To attain this, the present invention essentially comprises, in combination, an electromechanical solenoid valve that is coupleable to an input water line of a water heater. The solenoid valve has an opened orientation for allowing the flow of water within the input line and a closed orientation when energized for preventing such flow. An electronic water sensing mechanism is included and positionable at a location below the water heater for providing an electric signal when it is placed in contact with water when the water heater experiences the leaking or the overflow condition. Lastly, an electronic relay switching mechanism is included and coupled to the solenoid valve and the water sensing mechanism and is further coupleable to an external power source. The relay switching mechanism is responsive to receipt of the signal from the water sensing mechanism for energizing the solenoid valve and for further de-energizing the solenoid valve when the signal is not received.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved overflow protection shut-off apparatus for use with a water heater which has all the advantages of the prior art water heater shut-off devices and none of the disadvantages.

It is another object of the present invention to provide a new and improved overflow protection shut-off apparatus for use with a water heater which may be easily and efficiently manufactured and marketed.

It is a further object of the present invention to provide a new and improved overflow protection shut-off apparatus for use with a water heater which is of durable and reliable construction.

An even further object of the present invention is to provide a new and improved overflow protection shut-off apparatus for use with a water heater which is susceptible of a low cost of manufacture with regard to both materials and labor, and which accordingly is then susceptible of low prices of sale to the consuming public, thereby making such an overflow protection shut-off apparatus for use with a water heater economically available to the buying public.

Still yet another object of the present invention is to provide a new and improved overflow protection shut-off apparatus for use with a water heater which provides in the apparatuses and methods of the prior art some of the advantages thereof, while simultaneously overcoming some of the disadvantages normally associated therewith.

Even still another object of the present invention is to provide a new and improved overflow protection shut-off apparatus for use with a water heater for shutting off a supply of water to the water heater when a leaking or an overflow condition occurs.

Lastly, it is an object of the present invention to provide a new and improved overflow protection shut-off apparatus for use with a water heater comprising valve means coupleable to an input water line of a water heater and having an opened orientation for allowing flow of water within the input line and a closed orientation for preventing such flow; water sensing means positionable at a location proximal to the water heater for providing a signal when it is placed in contact with water when the water heater experiences the leaking or the overflow condition; and switching means coupled to the valve means and the water sensing means and being responsive to receipt of the signal from the water sensing means for placing the valve means in the closed orientation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a cross-sectional view of the present invention taken along the line 5—5 of FIG. 3.

FIG. 6 is a cross-sectional view of the present invention taken along the line 6—6 of FIG. 5.

The same reference numerals refer to the same parts through the various Figures.

DESCRIPTION OF THE PREFERRED EMBODIMENT

Figure 1:
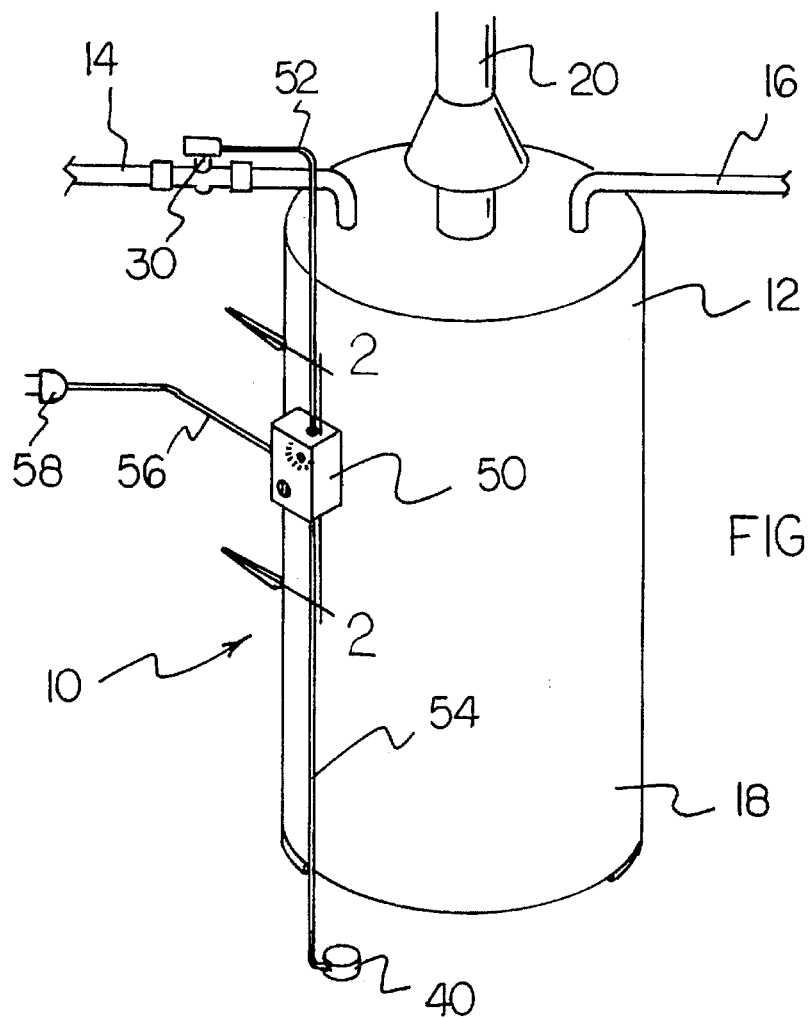
FIG. 1 is a perspective view of the preferred embodiment constructed in accordance with the principles of the present invention.
Figure 2:
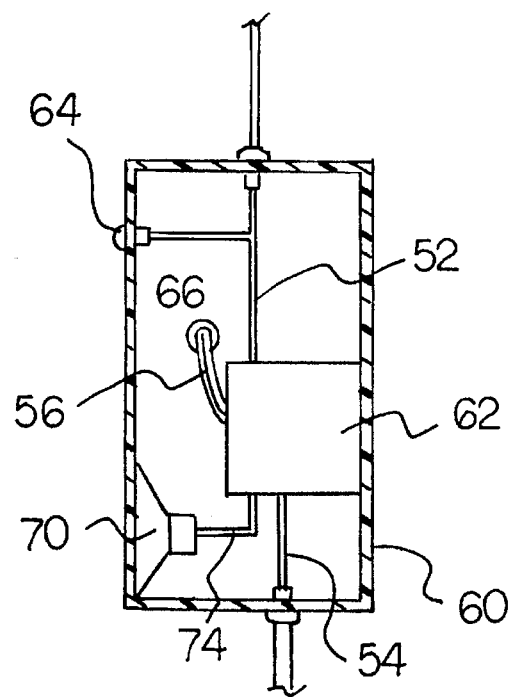
FIG. 2 is a cross-sectional view of the present invention taken along the line 2—2 of FIG. 1.
Figure 3:
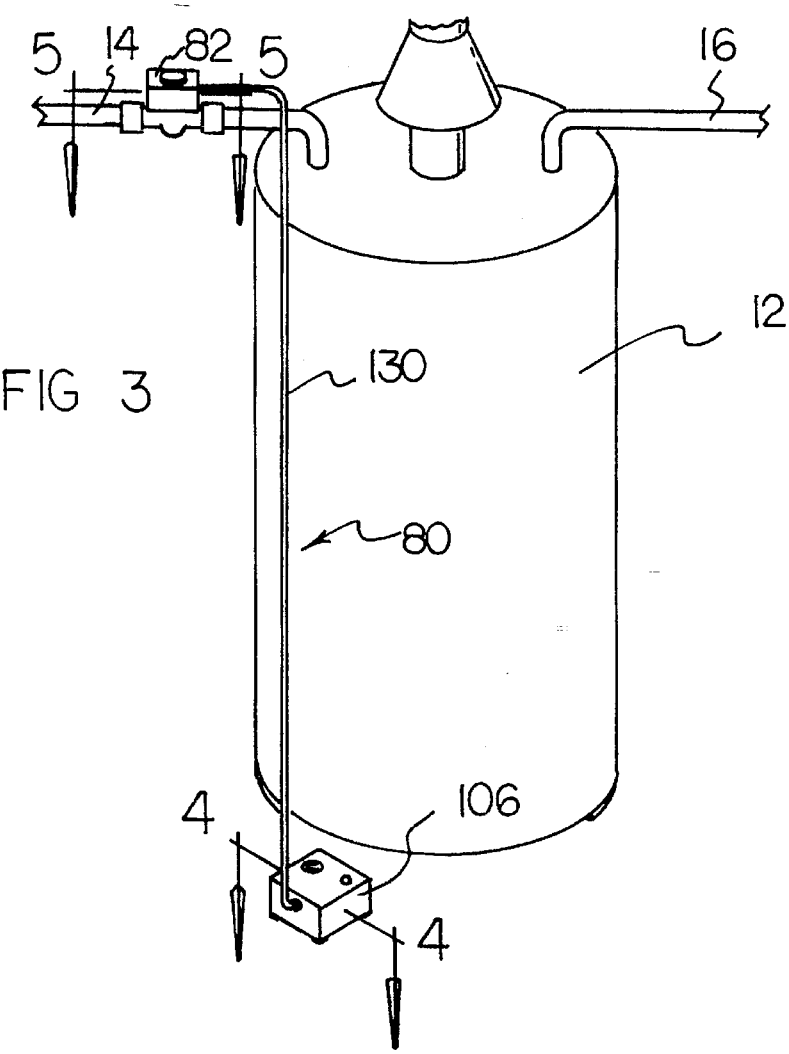
FIG. 3 is a perspective view of an alternate embodiment of the present invention.
Figure 4:
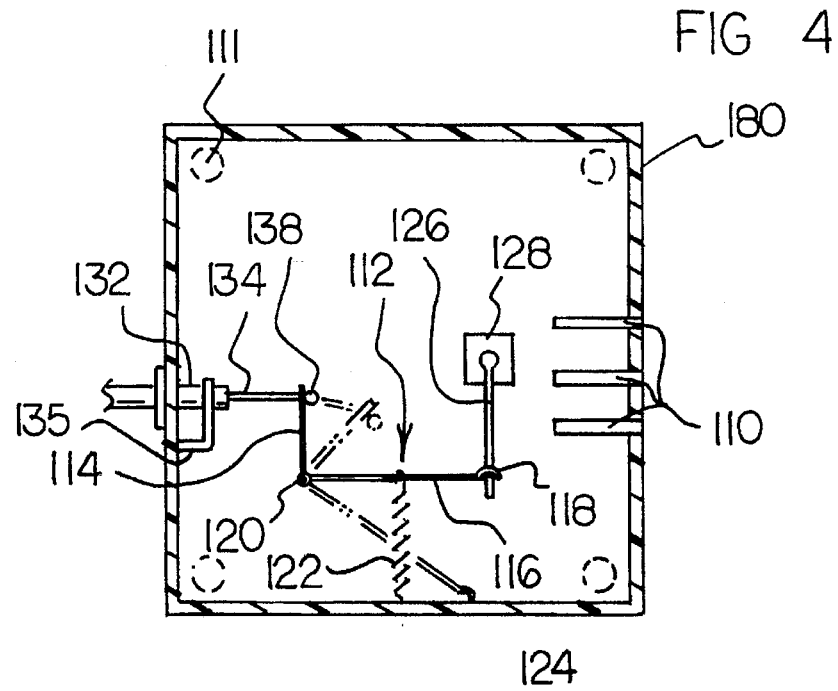
FIG. 4 is a cross-sectional view of the present invention taken along the line 4—4 of FIG. 3.

With reference now to the drawings, and in particular, to FIG. 1 thereof, the preferred embodiment of the new and improved overflow protection shut-off apparatus for use with a water heater embodying the principles and concepts of the present invention and generally designated by the reference number 10 will be described.

The preferred embodiment of the present invention comprises a plurality of components that form a general water heater overprotection circuit. In their broadest context, such components include a water shut-off valve, overflow water sensing mechanism, and switching mechanism. Such components are individually configured and correlated with respect to each other to provide an apparatus that shuts off a supply of water to a water heater when the water heater experiences a leaking or an overflow condition to thereby prevent flooding or ancillary water damage.

The present invention is adapted for use with a water heater 12. The water heater has an input line 14 for receiving a source of water to be heated. The water heater has an output line 16 for delivering the heated water for use. The water heater includes a central body 18 with an unillustrated heating element disposed within the body for heating water. Electrical or gas lines are interfaced to the heating element to allow for its energizing. These lines pass through conduit 20.

The present invention includes an electromechanical 24 volt DC solenoid valve. The solenoid valve is coupled to the input water line 14 of the water heater 12 and in communication with its flow of water. The solenoid valve has an open orientation, for allowing the flow of water within the water line to the water heater. The solenoid valve also has a closed orientation when energized for preventing such flow. The solenoid valve is conventional in design and commercially available.

Also included is a commercially available electronic water sensing mechanism 40. The water sensing mechanism 40 is positionable at a location below and adjacent to the water heater 12. The water sensing mechanism provides an electric signal when it is placed in contact with water such as when the water heater experiences a leaking or overflow condition.

Lastly, an electronic relay switching mechanism 50 is provided. The electronic switching mechanism is coupled to the solenoid valve 30 and the water sensing mechanism 40 through electric lines 52, 54. The relay switching mechanism is further coupleable to an external power source through a power cable 56 with associated plug 58. If conventional household line power is utilized, a transformer is included to convert the 110 volts AC input to 24 volts DC for use. The relay switching mechanism is responsive to receipt of the signal from the water sensing mechanism for energizing the solenoid valve, thereby preventing flow of water within the input water line, and for further de-energizing the solenoid valve when the signal is not received, thereby allow flow of water within the input water line. The relay switching mechanism includes a control box 60 with conventional relay 62. The activation status of the solenoid valve is viewable via a light emitting diode 64. Diode 64 provides a visual indication of solenoid valve energization when the relay 62 is engaged. The light emitting diode 64 is coupled to wire 52 through electric cable 66. In addition, a speaker 70 is also provided. The speaker transmits an audible indication of solenoid activation and is coupled to relay 62 through electric cable 74.

A second embodiment 80 of the present invention is shown in FIGS. 3 through 6. In this embodiment, a resettable mechanical stop valve mechanism 82 is provided in conjunction with a mechanical switching mechanism. The stop valve mechanism 82 includes a generally T-shaped fitting 84 with compression bearings 86. The fitting 84 is securable to the input water line 14 of the water heater. In addition, the stop valve mechanism includes an axially rotatable stem 88 having an upper extent 90 and a lower extent 92. The lower extent 92 is engaged within the fitting 84 and secured with a nut 94. The stem is rotatable to an opened position for allowing water flow within the input line. The stem is further rotatable to a closed position for preventing such water flow. A cam 96 is secured to the stem. The cam is formed of a rigid disk with an outwardly projecting abutment edge 98. A coil spring 100 is coupled to the stem 80 between the cam 96 and the fitting 84. The coil spring has a biased orientation for placing the stem in an opened position and an unbiased orientation for placing the stem in the closed position. When the stem is axially rotated, the cam is also axially rotated. Lastly, the stop valve mechanism 82 includes a hand turnable knob 102 that is coupled to the upper extent 90 of the stem. Upon discretion of a user, turning of knob 102 allows the coil spring to be placed in the biased orientation. The valve stop mechanism is encased in rigid housing 104.

In addition, the second embodiment includes a mechanical switching mechanism 106. The switching mechanism includes a hollow and rigid housing 108 with a plurality of slotted apertures 110 formed thereon. The apertures are used for receiving a flow of water from the water heater when it is leaking or when an overflow condition occurs. The housing is supported on a recipient surface with four nonskid feet 111. A rigid and L-shaped lever 112 is disposed within the housing. The lever has a short arm 114, a long arm 116 with a hooked outboard end 118, and a location therebetween that is pivotally coupled to the housing with pivot pin 120. A spring 122 is coupled between the long arm 116 of the lever and a side wall 124 of the housing 108. A strip 126 of water-soluble paper, fabric, or other organic material is included. The strip has one end coupled to the housing with mounting block 128 and another end coupled through friction, a knot, or a loop to the outboard end 118 of the long arm of the lever. The strip thereby holds the spring of the switch mechanism in a biased position. Lastly, the switching mechanism 106 includes a cable formed of a sleeve 132 and a slidable inner lead 134. The cable has a first end 136 held in contact with the abutment edge 98 of the cam of the valve mechanism and a second end 138 coupled to the short arm of the lever. The cable is held in place with bracket 135 and associated grommet. The strip 126 is dissolvable when placed in contact with water entering the housing to allow release of lever 112 and thereby release the first end 136 of the cable from contact with the cam. Thus, the spring 100 retracts, and the valve stop mechanism is closed to prevent water flow to the water heater.

In addition, an electric horn mechanism 140 is disposed within the housing 104. The horn is used for providing an audible indication of the leaking or the overflow condition of the water heater such as when the cam is released from contact with the first end 136 of the cable. A battery 106 is used for supplying electrical energy to the horn. The battery is held in place with brackets 108. The battery is removable through an unillustrated access door on the housing 142. The battery is coupled to the horn through leads 144 and 146. Lastly, a depressible switch 150 is coupled to the horn and the battery through wire 152. The switch has a depressed orientation when placed in contact with the abutment edge 98 of the cam for allowing electrical energy to be delivered to the horn mechanism 140, thus allowing the horn mechanism to be sounded. The switch also has a released orientation for preventing such delivery of electrical energy.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. An overflow protection shut-off device for use with a water heater for shutting off a supply of water to the water heater when a leaking condition occurs comprising, in combination:

a resettable stop valve mechanism comprising:

a fitting securable to an input water line of a water heater, an axially rotatable stem engaged within the fitting and being rotatable to an opened position for allowing water flow within the input line and further being rotatable to a closed position for preventing such flow, a cam secured to the stem, a coil spring coupled to the stem and having a biased orientation for placing the stem in an opened position and an unbiased orientation for placing the stem in the closed position, and a hand-turnable knob coupled to the stem for allowing the coil spring to be placed in the biased orientation upon discretion of a user;

a switching mechanism comprising:

a hollow rigid housing with a plurality of apertures formed thereon for receiving a flow of water from the water heater when the leaking condition occurs, a rigid and L-shaped lever having a short arm, a long arm with a hooked outboard end, and a location therebetween that is pivotally coupled to the housing, a spring coupled between the long arm of the lever and the housing, a strip of water-soluble material having one end coupled to the housing and another end coupled to the outboard end of the long arm of the lever to thereby place the spring of the switch mechanism in a biased position, and a cable having a first end held in contact with the cam of the valve mechanism and a second end coupled to the short arm of the lever and with the strip dissolvable when placed in contact with water entering the housing to release the lever and remove the first end of the cable from contact with the cam, thus allowing closure of the stop valve mechanism;

electronic horn means for providing an audible indication of the leaking condition when the cam is released from contact with the first end of the cable;

a battery for supplying electrical energy to the horn; and a depressible switch coupled between the horn and the battery and having a depressed orientation when placed in contact with the cam for allowing electrical energy to be delivered to the horn means and a released orientation for preventing such delivery.

2. An overflow protection shut-off device for use with a water heater for shutting off a supply of water to the water heater when a leaking condition occurs comprising:

valve means coupleable to an input water line of a water heater and having an opened orientation for allowing flow of water within the input line and a closed orientation for preventing such flow, wherein the valve means includes a fitting securable to an input water line of a water heater; an axially rotatable stem engaged within the tubular fitting and being rotatable to an open position for allowing water flow within the input line and further being rotatable to a closed position for preventing such flow; a cam secured to the stem; a coil spring coupled to the stem and having a biased orientation for placing the stem in an open position and an unbiased orientation for placing the stem in the closed position; and a hand-turnable knob coupled to the stem for allowing the coil spring to be placed in the biased orientation upon discretion of a user;

a electronic battery-operated horn means for providing an audible indication of the leaking condition when the coil spring is in the unbiased orientation;

water sensing means positionable at a location proximal to the water heater for providing a signal when it is placed in contact with water when the water heater experiences the leaking condition; and switching means coupled to the valve means and the water sensing means and being responsive to receipt of the signal from the water sensing means for placing the valve means in the closed orientation.

3. An overflow protection shut-off device for use with a water heater for shutting off a supply of water to the water heater when a leaking condition occurs comprising:

valve means coupleable to an input water line of a water heater and having an opened orientation for allowing flow of water within the input line and a closed orientation for preventing such flow;

water sensing means positionable at a location proximal to the water heater for providing a signal when it is placed in contact with water when the water heater experiences the leaking condition;

switching means coupled to the valve means and the water sensing means and being responsive to receipt of the signal from the water sensing means for placing the valve means in the closed orientation, wherein the switching means comprises a hollow housing with a plurality of apertures formed thereon for receiving a flow of water from the water heater when the leaking condition occurs; a rigid and L-shaped lever having a short arm, a long arm with an outboard end, and a location therebetween that is pivotally coupled to the housing; a spring coupled between the long arm of the lever and the housing; and a cable having a first end engaged with the valve means and a second end coupled to the short arm of the lever;

wherein the water sensing means comprises a strip of water-soluble material having one end coupled to the housing and another end coupled to the outboard end of the long arm of the lever to thereby place the spring of the switching means in a biased position, and with the strip dissolvable when placed in contact with water entering the housing to release the lever and allow closure of the valve means.

\* \* \* \* \*